United States Patent
Barbosa et al.

(10) Patent No.: US 12,441,873 B2
(45) Date of Patent: Oct. 14, 2025

(54) POLYMER FORMULATIONS AND IRRIGATION TUBING INCLUDING POLYMER FORMULATIONS

(71) Applicants: Dow Global Technologies LLC, Midland, MI (US); PBBPolisur S.R.L., Buenos Aires (AR)

(72) Inventors: Felipe D. Barbosa, Sao Paulo (BR); Marcela E. Laporta, Perto Madero (AR); Jorge C. Gomes, Sao Paulo (BR); Nicolas C. Mazzola, Sao Paulo (BR); Davidson Lutkenhaus, Sao Paulo (BR)

(73) Assignees: Dow Global Technologies LLC, Midland, MI (US); PBBPolisur S.R.L., Buenos Aires (AR)

(*) Notice: Subject to any disclaimer, the term of this patent is extended or adjusted under 35 U.S.C. 154(b) by 571 days.

(21) Appl. No.: 17/999,658

(22) PCT Filed: May 21, 2021

(86) PCT No.: PCT/US2021/033521
§ 371 (c)(1),
(2) Date: Nov. 22, 2022

(87) PCT Pub. No.: WO2021/242619
PCT Pub. Date: Dec. 2, 2021

(65) Prior Publication Data
US 2023/0212378 A1    Jul. 6, 2023

Related U.S. Application Data

(60) Provisional application No. 63/030,471, filed on May 27, 2020.

(51) Int. Cl.
*C08L 23/06* (2006.01)
*C08F 2/06* (2006.01)
(Continued)

(52) U.S. Cl.
CPC ............ *C08L 23/0815* (2013.01); *C08F 2/06* (2013.01); *C08F 210/16* (2013.01); *C08L 23/06* (2013.01);
(Continued)

(58) Field of Classification Search
CPC .. C08L 23/06; C08L 23/0815; C08L 2205/02; C08L 2205/025; C08L 2205/03; C08F 4/64193; C08F 4/654
See application file for complete search history.

(56) References Cited

U.S. PATENT DOCUMENTS 3,645,992 A    2/1972 Elston
3,914,342 A    10/1975 Mitchell
(Continued)

FOREIGN PATENT DOCUMENTS

EP    3327072 A1    5/2018
EP    3772414 A1    2/2021
(Continued)

OTHER PUBLICATIONS

International Search Report and Written Opinion issued by the European Patent Office acting as International Searching Authority for International Patent Application No. PCT/US2021/033521 dated Oct. 21, 2021 (13 total pages).
(Continued)

*Primary Examiner* — Rip A Lee
(74) *Attorney, Agent, or Firm* — Dinsmore & Shohl LLP

(57) ABSTRACT

Embodiments of polyethylene formulations and articles comprising polyethylene formulations are disclosed. The polyethylene formulation may include from 45 wt. % to 90 wt. % of an MDPE having a density of from 0.930 g/cc to 0.950 g/cc and a melt index ($I_2$) from 0.05 g/10 min to 0.5 g/10 min; from 10 wt. % to 50 wt. % of a polyethylene composition having a density from 0.910 g/cc to 0.936 g/cc
(Continued)

and a melt index ($I_2$) from 0.7 g/10 min to 1.0 g/10 min; and from 0.5 wt. % to 5% of a masterbatch composition. The polyethylene composition may comprise a first polyethylene fraction area in a temperature range of 45° C. to 87° C. of an elution profile via improved comonomer composition distribution (iCCD) analysis method and a second polyethylene fraction area in a temperature range of 95° C. to 120° C. of an elution profile via iCCD.

15 Claims, 2 Drawing Sheets

(51) Int. Cl.
*C08F 210/16* (2006.01)
*C08L 23/0807* (2025.01)
*C08F 4/64* (2006.01)
*C08F 4/654* (2006.01)

(52) U.S. Cl.
CPC .......... *C08F 4/64193* (2013.01); *C08F 4/654* (2013.01); *C08L 2203/18* (2013.01); *C08L 2205/025* (2013.01); *C08L 2205/03* (2013.01); *C08L 2205/05* (2013.01); *C08L 2310/00* (2013.01); *C08L 2314/02* (2013.01)

(56) References Cited

U.S. PATENT DOCUMENTS

| | | |
|---|---|---|
| 4,076,698 A | 2/1978 | Anderson et al. |
| 4,314,912 A | 2/1982 | Lowery, Jr. et al. |
| 4,547,475 A | 10/1985 | Glass et al. |
| 4,612,300 A | 9/1986 | Coleman, III |
| 5,064,802 A | 11/1991 | Stevens et al. |
| 5,153,157 A | 10/1992 | Hlatky et al. |
| 5,272,236 A | 12/1993 | Lai et al. |
| 5,278,272 A | 1/1994 | Lai et al. |
| 5,296,433 A | 3/1994 | Siedle et al. |
| 5,321,106 A | 6/1994 | LaPointe |
| 5,350,723 A | 9/1994 | Neithamer et al. |
| 5,425,872 A | 6/1995 | Devore et al. |
| 5,582,923 A | 12/1996 | Kale et al. |
| 5,625,087 A | 4/1997 | Devore et al. |
| 5,721,185 A | 2/1998 | LaPointe et al. |
| 5,783,512 A | 7/1998 | Jacobsen et al. |
| 5,883,204 A | 3/1999 | Spencer et al. |
| 5,919,983 A | 7/1999 | Rosen et al. |
| 5,977,251 A | 11/1999 | Kao et al. |
| 6,103,657 A | 8/2000 | Murray |
| 6,114,486 A | 9/2000 | Rowland et al. |
| 6,515,155 B1 | 2/2003 | Klosin et al. |
| 6,696,379 B1 | 2/2004 | Carnahan et al. |
| 7,163,907 B1 | 1/2007 | Canich et al. |
| 7,858,706 B2 | 12/2010 | Arriola et al. |
| 8,372,931 B2 * | 2/2013 | Hermel-Davidock ..... C08J 5/18 526/348 |
| 8,629,214 B2 * | 1/2014 | Karjala .................. C08L 23/06 525/240 |
| 8,829,115 B2 * | 9/2014 | Hermel-Davidock ........ C08L 23/04 526/348 |
| 10,004,293 B2 | 6/2018 | Nakano et al. |
| 11,492,468 B2 * | 11/2022 | Biswas .................. C08L 23/06 |
| 11,969,976 B2 * | 4/2024 | Camelo .................. B32B 27/34 |
| 12,145,344 B2 * | 11/2024 | Hausmann ............ C08F 110/02 |
| 2008/0099584 A1 | 5/2008 | Raanan |
| 2014/0179873 A1 | 6/2014 | Lam et al. |
| 2017/0181498 A1 | 6/2017 | Whelan et al. |
| 2022/0275181 A1* | 9/2022 | Biswas .................. B32B 27/20 |
| 2023/0072649 A1* | 3/2023 | Biswas .................. B32B 27/18 |

FOREIGN PATENT DOCUMENTS

| | | |
|---|---|---|
| WO | 2005/095509 A1 | 10/2005 |
| WO | 2012057346 A1 | 5/2012 |
| WO | 2014035467 A1 | 3/2014 |
| WO | 2014/072057 A1 | 5/2014 |
| WO | 2017040127 A1 | 3/2017 |
| WO | 2017106166 A1 | 6/2017 |

OTHER PUBLICATIONS

Streigel, Andre M. et al., Modern Size Exclusion Liquid Chromatography: Practice of Gel Permeation and Gel Filtration Chromatography, Second Edition, p. 242 and p. 263 (2009).
Karjala, Teresa P., et al., "Detection of low levels of long-chain branching in polyolefins", Annual Technical Conference—Society of Plastics Engineers, 66th, pp. 887-891 (2008).
Argentine Office Action dated Dec. 10, 2024, pertaining to AR Patent Application No. 2021 01 01403, 2 pgs.
Chinese Office Action dated Dec. 23, 2024, pertaining to CN Patent Application No. 202180037942.5, 6 pgs.
Brazil Technical Report dated Jul. 16, 2024, pertaining to BR Patent Application No. BR112023011399-7, 8 pgs.
Chilean Office Action dated May 17, 2024, pertaining to CL Patent Application No. 2022 03344, 28 pgs.
Chinese Office Action and Search Report dated Mar. 8, 2024, pertaining to CN Patent Application No. 202180037942.5, 10 pgs.

* cited by examiner

POLYMER FORMULATIONS AND IRRIGATION TUBING INCLUDING POLYMER FORMULATIONS

CROSS REFERENCE TO RELATED APPLICATIONS

This application claims priority to U.S. Provisional Patent Application No. 63/030,471, filed on May 27, 2020, and International Patent Application No. PCT/US2021/033521, filed on May 21, 2021, the entireties of both which are hereby incorporated by reference.

TECHNICAL FIELD

Embodiments described herein generally relate to polyethylene formulations and more specifically relate to articles, such as irrigation tubing, including polyethylene formulations.

BACKGROUND

Irrigation tubing is used by the agricultural industry as an economical and effective means of watering crops. Irrigation tubing includes drip tapes and tubing, which may be made from polymer materials. The irrigation tubing may include perforations in the walls of the tubing that allow for water (or other liquids) to be discharged through the perforations as it flows through the tubing.

SUMMARY

The irrigation tubing market is continually looking for solutions to allow for the production of thinner tubing without compromising stiffness and burst strength. Therefore, it is beneficial for polymer drip irrigation tape and tubing to demonstrate sufficient stiffness and burst strength properties while allowing for a reduction of material costs, for example, from downgauging (i.e., using thinner film thicknesses), or by reducing or eliminating relatively expensive materials. Accordingly, there are needs for polymer formulations, which may be utilized in irrigation tubing applications that exhibit stiffness and burst strength properties that meet customer and industry requirements, while allowing for reduced material costs.

Embodiments of the present disclosure meet these needs by providing a polyethylene formulation comprising a medium density polyethylene, a polyethylene composition, and a masterbatch composition. When utilized in irrigation tubing, the polyethylene formulation may provide a combination of desirable burst strength without compromising stiffness even when reducing thicknesses by 15%. As such, embodiments of the present disclosure may provide a polyethylene formulation that, when utilized in irrigation tubing, provides a balance of improved stiffness and burst strength properties, while allowing for reduced material costs.

According to one or more embodiments, a polyethylene formulation is provided. The polyethylene formulation may include from 45 weight percent (wt. %) to 90 wt. % of a medium density polyethylene (MDPE) having a density of from 0.930 grams per cubic centimeter (g/cc) to 0.950 g/cc and a melt index ($I_2$) from 0.05 grams per ten minutes (g/10 min) to 0.5 g/10 min; from 10 wt. % to 50 wt. % of a polyethylene composition having a density from 0.910 g/cc to 0.936 g/cc and a melt index ($I_2$) from 0.25 g/10 min to 2.0 g/10 min; and from 0.5 wt. % to 5% of a masterbatch composition. The polyethylene composition may include a first polyethylene fraction area in a temperature range of 45° C. to 87° C. of an elution profile via improved comonomer composition distribution (iCCD) analysis method and a second polyethylene fraction area in a temperature range of 95° C. to 120° C. of an elution profile via improved comonomer composition distribution (iCCD) analysis method. The first polyethylene fraction area may comprise at least 50% of the total area of the elution profile. The second polyethylene fraction area may comprise less than or equal to 23% of the total area of the elution profile. A ratio of the first polyethylene fraction area to the second polyethylene fraction area may be from 2.9 to 12.5.

According to one or more embodiments, an article is provided. The article may be irrigation tubing. The article may include the above polyethylene formulation. These and embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
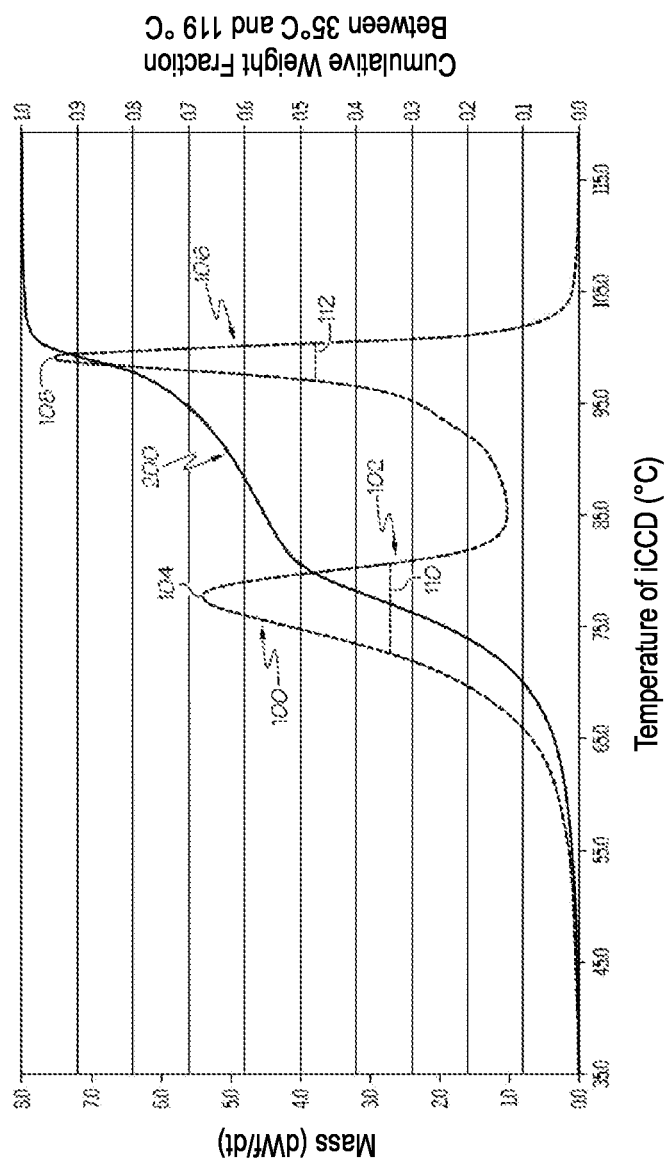
FIG. 1 graphically depicts the elution profile of a polyethylene composition, according to one or more embodiments presently described.
Figure 2:
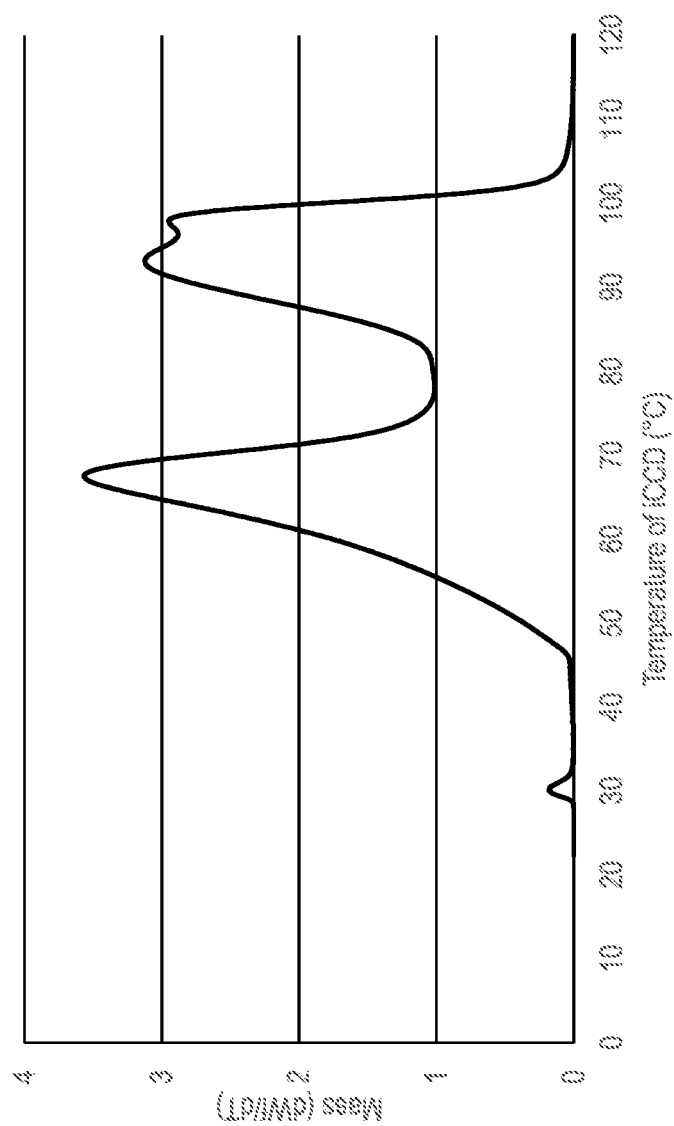
FIG. 2 graphically depicts the elution profile of an exemplary embodiment of a polyethylene composition, according to one or more embodiments presently described.

Specific embodiments of the present application will now be described. These embodiments are provided so that this disclosure will be thorough and complete and will fully convey the scope of the claimed subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference in its entirety). LDPE resins typically have a density in the range of 0.916 g/cm$^3$ to 0.940 g/cm$^3$.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155 each of which are incorporated herein by reference in their entirety; the homogeneously branched linear ethylene polymer compositions such as those in U.S. Pat. No. 3,645,992 which is incorporated herein by reference in its entirety; the heterogeneously branched ethylene polymers such as those prepared according to the process disclosed in U.S. Pat. No. 4,076,698 which is incorporated herein by reference in its entirety; and blends thereof (such as those disclosed in U.S. Pat. Nos. 3,914,342 and 5,854,045 which are incorporated herein by reference in their entirety. The LLDPE resins can be made via gas-phase, solution-phase, or slurry polymerization or any combination thereof, using any type of reactor or reactor configuration known in the art.

As used herein, the term "MDPE" refers to polyethylenes having densities from 0.930 g/cm$^3$ to 0.950 g/cm$^3$. MDPEs are typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than 0.950 g/cm$^3$ and up to 0.980 g/cm$^3$. HDPEs are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 g/cm$^3$ to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 g/cm$^3$ to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Embodiments of polyethylene formulations will now be described. Embodiments of the presently-described polyethylene formulations, when utilized in drip irrigation applications, may provide a balance of improved stiffness and improved burst strength properties. Additionally, embodiments of the presently-described polyethylene formulations may provide such balance of improved stiffness and improved burst strength properties even at reduced thicknesses (downgauging). In one or more embodiments, the polyethylene formulation may include a medium density polyethylene, a polyethylene composition, and a masterbatch composition.

In one or more embodiments, the polyethylene formulation may include a medium density polyethylene (MDPE). Without being bound by theory, it is believed that having at least 45 wt. % MDPE may impart sufficient stiffness properties to the polyethylene formulation. MDPEs may typically be made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent alkoxyether catalysts (typically referred to as bisphenyl phenoxy). In embodiments, the MDPE may have a density from 0.930 g/cm$^3$ to 0.950 g/cm$^3$, when measured according to ASTM D792. In embodiments, the MDPE may have a density from 0.930 g/cm$^3$ to 0.945 g/cm$^3$, from 0.930 g/cm$^3$ to 0.940 g/cm$^3$, from 0.930 g/cm$^3$ to 0.935 g/cm$^3$, from 0.935 g/cm$^3$ to 0.950 g/cm$^3$, from 0.935 g/cm$^3$ to 0.945 g/cm$^3$, from 0.935 g/cm$^3$ to 0.940 g/cm$^3$, from 0.940 g/cm$^3$ to 0.950 g/cm$^3$, from 0.940 g/cm$^3$ to 0.945 g/cm$^3$, or from 0.945 g/cm$^3$ to 0.950 g/cm$^3$.

In one or more embodiments, the MDPE may have a melt index ($I_2$) of from 0.05 g/10 minutes (g/10 min) to 0.5 g/10 min, when measured according to ASTM D-1238 at 190° C. and 2.16 kg. In embodiments, the MDPE may have a melt index ($I_2$) of from 0.05 g/10 min to 0.4 g/10 min, from 0.05 g/10 min to 0.3 g/10 min, from 0.05 g/10 min to 0.2 g/10 min, from 0.05 g/10 min to 0.1 g/10 min, from 0.1 g/10 min to 0.5 g/10 min, from 0.1 g/10 min to 0.4 g/10 min, from 0.1 g/10 min to 0.3 g/10 min, from 0.1 g/10 min to 0.2 g/10 min, from 0.2 g/10 min to 0.5 g/10 min, from 0.2 g/10 min to 0.4 g/10 min, from 0.2 g/10 min to 0.3 g/10 min, from 0.3 g/10 min to 0.5 g/10 min, from 0.3 g/10 min to 0.4 g/10 min, from 0.4 g/10 min to 0.5 g/10 min, or any combination of these ranges when measured according to ASTM D-1238 at 190° C. and 2.16 kg.

In one or more embodiments, the polyethylene formulation may include up to 90% by weight of MDPE, based on the total weight of the polyethylene formulation. In some embodiments, the polyethylene formulation may include from 45 wt. % to 80 wt. %, from 45 wt. % to 70 wt. %, from 45 wt. % to 60 wt. %, from 45 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, or from 80 wt. % to 90 wt. % of MDPE, based on the total weight of the polyethylene formulation.

In one or more embodiments, the polyethylene formulation may include a masterbatch composition. In embodiments, the masterbatch composition may comprising carbon black. In embodiments, carbon black may be useful for imparting UV absorption and stabilizing properties to the polyethylene formulation. In one or more embodiments, the polyethylene formulation may include at least 0.5% by weight of the masterbatch composition, based on the total weight of the polyethylene formulation. In some embodiments, the polyethylene formulation may include from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. %, based on the total weight of the polyethylene formulation.

The masterbatch composition may include a carrier resin. In embodiments, the carrier resin may be a low density polyethylene (LDPE), a linear low density polyethylene (LLDPE), a medium density polyethylene (MDPE), a high density polyethylene (HDPE), or combinations thereof. In some embodiments, the carrier resin is a LDPE. In other embodiments, the second polyethylene is a LLDPE. In further embodiments, the second polyethylene is a MDPE or a HDPE. The carrier resin may have a density ranging from 0.860 g/cm$^3$ to 0.980 g/cm$^3$ and a melt index ranging from 0.01 g/10 min to 100 g/10 min. All individual values and subranges of a density ranging from 0.860 g/cm$^3$ to 0.970 g/cm$^3$ and a melt index ranging from 0.01 g/10 min to 100 g/10 min are included and disclosed herein. In embodiments, the carrier resin may have a density of from 0.860 g/cm$^3$ to 0.970 g/cm$^3$, from 0.860 g/cm$^3$ to 0.960 g/cm$^3$, from 0.860 g/cm$^3$ to 0.940 g/cm$^3$, from 0.860 g/cm$^3$ to 0.920 g/cm$^3$, from 0.860 g/cm$^3$ to 0.900 g/cm$^3$, from 0.900 g/cm$^3$ to 0.970 g/cm$^3$, from 0.900 g/cm$^3$ to 0.960 g/cm$^3$, from 0.900 g/cm$^3$ to 0.940 g/cm$^3$, from 0.900 g/cm$^3$ to 0.920 g/cm$^3$, from 0.920 g/cm$^3$ to 0.970 g/cm$^3$, from 0.920 g/cm$^3$ to 0.960 g/cm$^3$, from 0.920 g/cm$^3$ to 0.940 g/cm$^3$, from 0.940 g/cm$^3$ to 0.970 g/cm$^3$, from 0.940 g/cm$^3$ to 0.960 g/cm$^3$, from 0.960 g/cm$^3$ to 0.970 g/cm$^3$, or any combinations of these ranges. In embodiments, the carrier resin may have a melt index of from 0.05 g/10 min to 30 g/10 min, from 0.1 g/10 min to 30 g/10 min, from 0.1 g/10 min to 25 g/10 min, from 0.1 g/10 min to 20 g/10 min, from 0.1 g/10 min to 18 g/10 min, from 0.1 g/15 min to 30 g/10 min, from 0.25 g/10 min to 15 g/10 min, from 0.25 g/10 min to 12 g/10 min, from 0.25 g/10 min to 10 g/10 min, from 0.25 g/10 min to 8 g/10 min, from 0.25 g/10 min to 5 g/10 min.

In embodiments, the polyethylene formulation may include a polyethylene composition. As used herein, the presently-disclosed polyethylene compositions may be formed from the polymerization of ethylene and a comonomers such as a $C_3$-$C_{12}$ alkene. Contemplated comonomers include $C_6$-$C_9$ alkenes, such as 1-octene and 1-hexene. In one or more embodiments the comonomers is 1-octene.

In one or more embodiments, the polyethylene composition may have a density of from 0.910 g/cm$^3$ to 0.936 g/cm$^3$, when measured according to ASTM D792. In embodiments, the presently disclosed polyethylene compositions may a density from 0.910 g/cm$^3$ to 0.930 g/cm$^3$, from 0.910 g/cm$^3$ to 0.925 g/cm$^3$, from 0.910 g/cm$^3$ to 0.920 g/cm$^3$, from 0.910 g/cm$^3$ to 0.915 g/cm$^3$, from 0.915 g/cm$^3$ to 0.936 g/cm$^3$, from 0.915 g/cm$^3$ to 0.930 g/cm$^3$, from 0.915 g/cm$^3$ to 0.925 g/cm$^3$, from 0.915 g/cm$^3$ to 0.920 g/cm$^3$, from 0.920 g/cm$^3$ to 0.936 g/cm$^3$, from 0.920 g/cm$^3$ to 0.930 g/cm$^3$, from 0.920 g/cm$^3$ to 0.925 g/cm$^3$, from 0.925 g/cm$^3$ to 0.936 g/cm$^3$, from 0.925 g/cm$^3$ to 0.930 g/cm$^3$, from 0.930 g/cm$^3$ to 0.936 g/cm$^3$, or any combination of these ranges, when measured according to ASTM D792.

In one or more embodiments, the polyethylene composition may have a melt index ($I_2$) of from 0.25 g/10 minutes (g/10 min) to 2.0 g/10 min, when measured according to ASTM D-1238 at 190° C. and 2.16 kg. In embodiments, the polyethylene composition may have a melt index ($I_2$) of from 0.25 g/10 min to 1.75 g/10 min, from 0.25 g/10 min to 1.50 g/10 min, from 0.25 g/10 min to 1.25 g/10 min, from 0.25 g/10 min to 1.0 g/10 min, from 0.25 g/10 min to 0.75 g/10 min, from 0.25 g/10 min to 0.50 g/10 min, from 0.50 g/10 min to 2.0 g/10 min, from 0.50 g/10 min to 1.75 g/10 min, from 0.50 g/10 min to 1.50 g/10 min, from 0.50 g/10 min to 1.25 g/10 min, from 0.50 g/10 min to 1.0 g/10 min, from 0.50 g/10 min to 0.75 g/10 min, from 0.75 g/10 min to 2.0 g/10 min, from 0.75 g/10 min to 1.75 g/10 min, from 0.75 g/10 min to 1.50 g/10 min, from 0.75 g/10 min to 1.25 g/10 min, from 0.75 g/10 min to 1.0 g/10 min, from 1.0 g/10 min to 2.0 g/10 min, from 1.0 g/10 min to 1.75 g/10 min, from 1.0 g/10 min to 1.50 g/10 min, from 1.0 g/10 min to 1.25 g/10 min, from 1.25 g/10 min to 2.0 g/10 min, from 1.25 g/10 min to 1.75 g/10 min, from 1.25 g/10 min to 1.50 g/10 min, from 1.50 g/10 min to 2.0 g/10 min, from 1.50 g/10 min to 1.75 g/10 min, from 1.75 g/10 min to 2.00 g/10 min, or any combination of these ranges when measured according to ASTM D-1238 at 190° C. and 2.16 kg.

In one or more embodiments, the polyethylene composition may include a melt index ratio ($I_{10}/I_2$) that meets the following equation: $110/12 \geq 7.0 - 1.2 \times \log (I_2)$. In embodiments, the polyethylene composition may have a melt index ratio 110/12 of from 5.5 to 8.5, from 5.5 to 8.0, from 5.5 to 7.5, from 5.5 to 7.0, from 5.5 to 6.5, from 5.5 to 6.0, from 6.0 to 8.5, from 6.0 to 8.0, from 6.0 to 7.5, from 6.0 to 7.0, from 6.0 to 6.5, from 6.5 to 8.5, from 6.5 to 8.0, from 6.5 to 7.5, from 6.5 to 7.0, from 7.0 to 8.5, from 7.0 to 8.0, from 7.0 to 7.5, from 7.5 to 8.5, from 7.5 to 8.0, or from 7.5 to 8.0. In embodiments, the polyethylene composition may have an 110/12 of from 7.7 to 8.1.

According to one or more embodiments, the polyethylene composition may have a zero shear viscosity ratio of from 1.2 to 3.0. In embodiments, the polyethylene composition may have a zero shear viscosity ratio of from 1.2 to 2.8, from 1.2 to 2.6, from 1.2 to 2.4, from 1.2 to 2.2, from 1.2 to 2.0, from 1.2 to 1.8, from 1.2 to 1.6, from 1.2 to 1.4, from 1.4 to 3.0, from 1.4 to 2.8, from 1.4 to 2.6, from 1.4 to 2.4, from 1.4 to 2.2, from 1.4 to 2.0, from 1.4 to 1.8, from 1.4 to 1.6, from 1.6 to 3.0, from 1.6 to 2.8, from 1.6 to 2.6, from 1.6 to 2.4, from 1.6 to 2.2, from 1.6 to 2.0, from 1.6 to 1.8, from 1.8 to 3.0, from 1.8 to 2.8, from 1.8 to 2.6, from 1.8 to 2.4, from 1.8 to 2.2, from 1.8 to 2.0, from 2.0 to 3.0, from 2.0 to 2.8, from 2.0 to 2.6, from 2.0 to 2.4, from 2.0 to 2.2, from 2.2 to 3.0, from 2.2 to 2.8, from 2.2 to 2.6, from 2.2 to 2.4, from 2.4 to 3.0, from 2.4 to 2.8, from 2.4 to 2.6, from 2.6 to 0.3, from 2.6 to 2.8, or from 2.8 to 3.0.

In embodiments, the polyethylene compositions may have a z-average molecular weight (Mz) of from 200,000 g/mol to 400,000 g/mol when measured by conventional GPC techniques as described herein. According to one or more embodiments, the polyethylene composition may have a Mz of from 200,000 g/mol to 350,000 g/mol, from 200,000 g/mol to 300,000 g/mol, from 200,000 g/mol to 250,000 g/mol, from 250,000 g/mol to 400,000 g/mol, from 250,000 g/mol to 350,000 g/mol, from 250,000 g/mol to 300,000 g/mol, from 300,000 g/mol to 400,000 g/mol, from 300,000 g/mol to 350,000 g/mol, or from 350,000 g/mol to 400,000 g/mol when measured by light-scattering GPC techniques as described herein. Without being bound by theory, a higher Mz may typically relate to greater mechanical properties; however, in embodiments of the present disclosure, the polyethylene compositions may exhibit improved mechanical properties, while having a z-average molecular weight (Mz) of from 200,000 g/mol to 400,000 g/mol.

In embodiments, the polyethylene composition may have a number average molecular weight (Mn), as determined by cony. GPC, in the range from 10,000 to 50,000 g/mole. For example, the number average molecular weight can be from a lower limit of 10,000, 20,000, or 25,000 g/mole, to an upper limit of 35,000, 40,000, 45,000, or 50,000 g/mole.

In embodiments, the polyethylene composition may have a melt viscosity ratio, Eta*0.1/Eta*100, in the range from 2.2 to 7.0. For example, the number average molecular weight can be from a lower limit of 2.2, 2.3, 2.4 or 2.5, to an upper limit of 6.0, 6.2, 6.5, or 7.0.

In embodiments, the polyethylene composition may have a weight average molecular weight (Mw), as determined by cony. GPC, in the range from 70,000 to 200,000 g/mole. For example, the number average molecular weight can be from a lower limit of 70,000, 75,000, or 78,000 g/mole, to an upper limit of 120,000, 140,000, 160,000, 180,000 or 200,000 g/mole.

According to embodiments, the polyethylene composition may have a molecular weight distribution, expressed as the ratio of the weight average molecular weight to number average molecular weight (Mw/Mn), as determined by cony. GPC, in the range of from 2.0 to 5.0. In embodiments, the polyethylene composition may have a molecular weight distribution of from 2.0 to 4.5, from 2.0 to 4.0, from 2.0 to 3.5, from 2.0 to 3.0, from 2.0 to 2.5, from 2.5 to 5.0, from 2.5 to 4.5, from 2.5 to 4.0, from 2.5 to 3.5, from 2.5 to 3.0, from 3.0 to 5.0, from 3.0 to 4.5, from 3.0 to 4.0, from 3.0 to 3.5, from 3.5 to 5.0, from 3.5 to 4.5, from 3.5 to 4.0, from 4.0 to 5.0, from 4.0 to 4.5, from 4.5 to 5.0, or any combination of these ranges. As presently described, the molecular weight distribution may be calculated according to gel permeation chromatography (GPC) techniques as described herein.

In embodiments, the polyethylene composition may have a ratio of the z-average molecular weight to the weight average molecular weight (Mz/Mw) of from 1.5 to 3.5 when measured by conventional GPC techniques as described here. According to one or more embodiments, the polyethylene composition may have a ratio of the z-average molecular weight to the weight average molecular weight (Mz/Mw) of from 1.5 to 3.0, from 1.5 to 2.5, from 1.5 to 2.0, from 1.5 to 1.8, from 1.8 to 3.5, from 1.8 to 3.0, from 1.8 to 2.5, from 1.8 to 2.0, from 2.0 to 3.5, from 2.0 to 3.0, from 2.0 to 2.5, from 2.5 to 3.5, from 2.5 to 3.0, or from 3.0 to 3.5 when measured by light-scattering GPC techniques as described herein.

In embodiments, the polyethylene composition comprises a Molecular Weighted Comonomer Distribution Index (MWCDI) value from 0.9 to 10.0. According to one or more embodiments, the polyethylene composition may have a MWCDI value of from 0.9 to 9.0, from 0.9 to 8.0, from 0.9 to 7.0, from 0.9 to 6.0, from 0.9 to 5.0, from 0.9 to 4.0, from 0.9 to 3.0, from 0.9 to 2.0, from 0.9 to 1.0, from 1.0 to 10.0, from 1.0 to 9.0, from 1.0 to 8.0, from 1.0 to 7.0, from 1.0 to 6.0, from 1.0 to 5.0, from 1.0 to 4.0, from 1.0 to 3.0, from 1.0 to 2.0, from 2.0 to 10.0, from 2.0 to 9.0, from 2.0 to 8.0, from 2.0 to 7.0, from 2.0 to 6.0, from 2.0 to 5.0, from 2.0 to 4.0, from 2.0 to 3.0, from 3.0 to 10.0, from 3.0 to 9.0, from 3.0 to 8.0, from 3.0 to 7.0, from 3.0 to 6.0, from 3.0 to 5.0, from 3.0 to 4.0, from 4.0 to 10.0, from 4.0 to 9.0, from 4.0 to 8.0, from 4.0 to 7.0, from 4.0 to 6.0, from 4.0 to 5.0, from 5.0 to 10.0, from 5.0 to 9.0, from 5.0 to 8.0, from 5.0 to 7.0, from 5.0 to 6.0, from 0.9 to 10.0, from 0.9 to 9.0, from 0.9 to 8.0, from 0.9 to 7.0, from 7.0 to 10.0, from 7.0 to 9.0, from 7.0 to 8.0, from 8.0 to 10.0, from 8.0 to 9.0, or from 9.0 to 10.0. Without being bound by theory, the Molecular Weighted Comonomer Distribution Index (MWCDI) value relates to the comonomer distribution, which affects polymer strength. A negative MWCDI value may reflect that a comonomer is not optimally distributed, and thus, the copolymer may fail to exhibit sufficient mechanical performance.

In one embodiment, the polyethylene composition has a vinyl unsaturation level greater than 10 vinyls per 1,000,000 total carbons. For example, greater than 20 vinyls per 1,000,000 total carbons, or greater than 50 vinyls per 1,000,000 total carbons, or greater than 70 vinyls per 1,000,000 total carbons, or greater than 100 vinyls per 1,000,000 total carbons.

As described herein, a polyethylene "fraction" refers to a portion of the total composition of the multimodal polyethylene composition. The presently-disclosed embodiments include at least a "first polyethylene fraction" and a "second polyethylene fraction." The various fractions included in the polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a peak in the temperature range of the first fraction and the second fraction may include a peak in the temperature range of the second fraction. The polyethylene compositions described herein may be referred to as "multimodal," meaning that they include at least two peaks in their elution profile.

In reference to the described iCCD distribution, FIG. 1 schematically depicts a sample iCCD distribution 100 along with the cumulative weight fraction curve 200. FIG. 1 depicts, generally, several features of the iCCD profiles of the presently described polyethylene compositions, such as the first fraction, the second fraction, the half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112. It should be understood that the profile of FIG. 1 is not derived from experimentation or observation, but is instead supplied for informational purposes of describing particular features of an iCCD elution profile.

In one or more embodiments, the polyethylene composition may have a first polyethylene fraction area in the temperature range from 45° C. to 87° C. of an elution profile via improved comonomer composition distribution (iCCD) analysis method. As used herein, the first polyethylene fraction area may be defined as the area in the elution profile beneath the single peak of the first polyethylene fraction between 45° C. and 87° C. The first polyethylene area fraction may correspond with the total relative mass of the polymer fraction in the multimodal polyethylene composition.

In embodiments, the first polyethylene fraction may have a single peak in a temperature range of 45° C. to 87° C. in an elution profile via iCCD. As used herein, a "single peak" refers to an iCCD wherein a particular fraction includes only one peak. That is, in some embodiments, the iCCD of the first polyethylene fraction includes only an upward sloping region followed by a downward sloping region to form the single peak. In one or more embodiments, the single peak of the first polyethylene fraction may be in a temperature range of from 60° C. to 80° C., such as from 65° C. to 75° C.

It should be understood that a peak in the first polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction area may comprise at least 50% of the total area of the elution profile (for example, at least 52%, at least 54%, at least 56%, at least 58%, and at least 60% of the total area of the elution profile). For example, the first polyethylene fraction area may comprise from 50% to 70% of the total area of the elution profile, such as from 50% to 65%, from 50% to 60%, or from 50% to 55% of the total area of the elution profile. Without being bound by theory, first polyethylene fraction area relates to the amount of comonomer incorporation, which therefore may affect the properties of the overall polyethylene composition. In embodiments, having a first polyethylene fraction area that comprises at least 50% of the total area of the elution profile may allow for the overall polyethylene composition to exhibit sufficient secant modulus proprieties, burst strength properties, or both.

In one or more embodiments, the polyethylene composition may have a second polyethylene fraction area in the temperature range from 95° C. to 120° C. of an elution profile via improved comonomer composition distribution (iCCD) analysis method. As used herein, the second polyethylene fraction area may be defined as the area in the elution profile beneath the third polyethylene fraction between 95° C. and 110° C. The first polyethylene area fraction may correspond with the total relative mass of the polymer fraction in the polyethylene composition.

In one or more embodiments, the second polyethylene fraction may have a single peak in the temperature range of 95° C. and 120° C. in the elution profile via iCCD. It should be understood that a peak in the second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction. The temperature range of the second polyethylene fraction of 95° C. to 120° C. may be desirable because the low molecular weight, high density component at 95° C. and 120° C. may allow the polyethylene to achieve higher overall density while maintaining a lower density fraction.

According to one or more embodiments, the second polyethylene fraction area may comprise less than or equal to 23% of the total area of the elution profile (for example, less than 15% or less than 10% of the total area of the elution profile). For example, the first polyethylene fraction area may comprise from 6% to 23%, from 6% to 20%, from 6% to 16%, from 6% to 12%, from 6% to 8%, from 8% to 23%, from 8% to 16%, from 8% to 12%, from 12% to 23%, from 12% to 16%, or from 16% to 23% of the total area of the elution profile.

According to some embodiments, a ratio of the first polyethylene fraction area to the second polyethylene fraction area may be from 2.9 to 12.5, from 2.9 to 12.0, from 2.9 to 10.0, from 2.9 to 8.0, from 2.9 to 6.0, from 2.9 to 4.0, from 2.9 to 3.0, from 3.0 to 12.5, from 3.0 to 12.0, from 3.0 to 10.0, from 3.0 to 8.0, from 3.0 to 6.0, from 3.0 to 4.0, from 4.0 to 12.5, from 4.0 to 12.0, from 4.0 to 10.0, from 4.0 to 8.0, from 4.0 to 6.0, from 6.0 to 12.5, from 6.0 to 12.0, from 6.0 to 10.0, from 6.0 to 8.0, from 8.0 to 12.5, from 8.0 to 12.0, from 8.0 to 10.0, from 10.0 to 12.5, from 10.0 to 12.0, from 12.0 to 12.5, or any combination of these ranges.

In embodiments, the polyethylene formulation may also include an HDPE, an LDPE, and combinations thereof.

In embodiments, the polyethylene formulation may include LDPE. In one or more embodiments, the LDPE may have a melt index from 0.1 g/10 min to 10.0 g/10 min when measured according to ASTM D1238 at a load of 2.16 kg and temperature of 190° C. In embodiments, the LDPE may have a melt index from 0.1 g/10 min to 5.0 g/10 min, or from 0.5 g/10 min to 5.0 g/10 min, or from 0.5 g/10 min to 2.0 g/10 min. In embodiments, the LDPE may have a density of from 0.916 g/cm$^3$ to 0.935 g/cm$^3$ when measured according to ASTM D792. In another embodiment, the LDPE may a density from 0.916 g/cm$^3$ to 0.925 g/cm$^3$.

In one or more embodiments, the polyethylene formulation may include up to 20% by weight LDPE, based on the total weight of the polyethylene formulation. In some embodiments, each subskin layer may include from 0 wt. % to 20 wt. %, from 0 wt. % to 15 wt. %, from 0 wt. % to 10 wt. %, from 0 wt. % to 5 wt. %, from 5 wt. % to 20 wt. %, from 5 wt. % to 15 wt. %, from 5 wt. % to 10 wt. %, from 10 wt. % to 20 wt. %, from 10 wt. % to 15 wt. %, or from 15 wt. % to 20 wt. % LDPE, based on the total weight of the polyethylene formulation.

In embodiments, the polyethylene formulation may include a high density polyethylene (HDPE) having a density from 0.950 g/cm$^3$ and up to 0.980 g/cm$^3$ when measured according to ASTM D792. In another embodiment, the HDPE may have a density from 0.950 g/cm$^3$ to 0.980 g/cm$^3$, from 0.950 g/cm$^3$ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, the polyethylene formulation may include an HDPE having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, HDPE resins may be made using Ziegler-Natta catalyst systems, chrome catalysts or single-site catalysts including, but not limited to, bis-metallocene catalysts and constrained geometry catalysts.

In one or more embodiments, the polyethylene formulation may include up to 20% by weight HDPE, based on the total weight of the polyethylene formulation. In some embodiments, each subskin layer may include from 0 wt. % to 20 wt. %, from 0 wt. % to 15 wt. %, from 0 wt. % to 10 wt. %, from 0 wt. % to 5 wt. %, from 5 wt. % to 20 wt. %, from 5 wt. % to 15 wt. %, from 5 wt. % to 10 wt. %, from 10 wt. % to 20 wt. %, from 10 wt. % to 15 wt. %, or from 15 wt. % to 20 wt. % HDPE, based on the total weight of the polyethylene formulation.

It should be understood that the polyethylene formulation may further comprise one or more additives as known to those of skill in the art such as, for example, plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the polyethylene formulation. In some embodiments, the polyethylene formulation may include up to 5 weight percent of such additional additives based on the total weight of the polyethylene formulation. In embodiments, the total amount of additives in the polyethylene formulation can be from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of the polyethylene formulation. The incorporation of the additives can be carried out by any known process such as, for example, by dry blending, by extruding a mixture of the various constituents, by the conventional master batch technique, or the like.

Polymerization of the Polyethylene Composition

Polymerization processes include, but are not limited to, solution polymerization processes, using one or more conventional reactors, e.g., loop reactors, isothermal reactors, adiabatic reactors, stirred tank reactors, autoclave reactors in parallel, series, and/or any combinations thereof. The polyethylene compositions may, for example, be produced via solution phase polymerization processes, using one or more loop reactors, adiabatic reactors, and combinations thereof.

In general, the solution phase polymerization process occurs in one or more well mixed reactors, such as one or more loop reactors and/or one or more adiabatic reactors at a temperature in the range from 115° C. to 250° C.; for example, from 135° C. to 200° C., and at pressures in the range of from 300 psig to 1000 psig, for example, from 450 psig to 750 psig.

In one embodiment, the polyethylene composition may be produced in two loop reactors in series configuration, where the first reactor temperature is in the range from 115° C. to 200° C., for example, from 135° C. to 165° C., and the second reactor temperature is in the range from 150° C. to 210° C., for example, from 185° C. to 200° C. In another embodiment, the polyethylene composition may be produced in a single reactor, the reactor temperature is in the range from 115° C. to 200° C., for example from 130° C. to 190° C. The residence time in a solution phase polymerization process is typically in the range from 2 minutes to 40 minutes, for example from 5 minutes to 20 minutes. Ethylene, solvent, one or more catalyst systems, optionally one or more cocatalysts, and optionally one or more comonomers, are fed continuously to one or more reactors. Exemplary solvents include, but are not limited to, isoparaffins. For example, such solvents are commercially available under the name ISOPAR E from ExxonMobil Chemical. The resultant mixture of the polyethylene composition and solvent is then removed from the reactor or reactors, and the polyethylene composition is isolated. Solvent is typically recovered via a solvent recovery unit, i.e., heat exchangers and separator vessel, and the solvent is then recycled back into the polymerization system.

In one embodiment, the polyethylene composition may be produced, via a solution polymerization process, in a dual reactor system, for example a dual loop reactor system, wherein ethylene, and optionally one or more α-olefins, are polymerized in the presence of one or more catalyst systems, in one reactor, to produce a first ethylene-based polymer, and ethylene, and optionally one or more α-olefins, are polymerized in the presence of one or more catalyst systems, in a second reactor, to produce a second ethylene-based polymer. Additionally, one or more cocatalysts may be present.

In another embodiment, the polyethylene composition may be produced via a solution polymerization process, in a single reactor system, for example, a single loop reactor system, wherein ethylene, and optionally one or more α-olefins, are polymerized in the presence of one or more catalyst systems. Additionally, one or more cocatalysts may be present.

Processes may include polymerizing ethylene, and optionally at least one comonomer, in solution, in the present of a catalyst system comprising a metal-ligand complex of Structure I, to form a first ethylene-based polymer; and polymerizing ethylene, and optionally at least one comonomer, in the presence of a catalyst system comprising a Ziegler/Natta catalyst, to form a second ethylene-based polymer; and wherein Structure I is as follows:

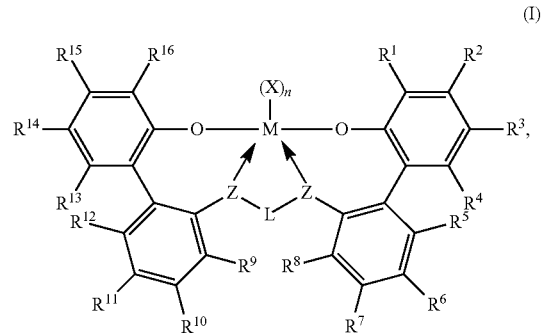

(I)

wherein: M is titanium, zirconium, or hafnium, each, independently, being in a formal oxidation state of +2, +3, or +4; and n is an integer from 0 to 3, and wherein when n is 0, X is absent; and each X, independently, is a monodentate ligand that is neutral, monoanionic, or dianionic; or two Xs are taken together to form a bidentate ligand that is neutral, monoanionic, or dianionic; and X and n are chosen, in such a way, that the metal-ligand complex of formula (I) is, overall, neutral; and each Z, independently, is O, S, N($C_1$-$C_{40}$)hydrocarbyl, or P($C_1$-$C_{40}$)hydrocarbyl; and wherein the Z-L-Z fragment is comprised of formula (1):

(1)

$R^1$ through $R^{16}$ are each, independently, selected from the group consisting of the following: a substituted or unsubstituted ($C_1$-$C_{40}$)hydrocarbyl, a substituted or unsubstituted ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom; and wherein each $R^C$ is independently a (C1-C30)hydrocarbyl; $R^P$ is a (C1-C30)hydrocarbyl; and $R^N$ is a (C1-C30)hydrocarbyl; and wherein, optionally, two or more R groups (from $R^1$ through $R^{16}$) can combine together into one or more ring structures, with such ring structures each, independently, having from 3 to 50 atoms in the ring, excluding any hydrogen atom.

In one embodiment, said process comprises polymerizing ethylene, and optionally at least one α-olefin, in solution, in the presence of a catalyst system comprising a metal-ligand complex of Structure I, to form a first ethylene-based polymer; and polymerizing ethylene, and optionally at least one α-olefin, in the presence of a catalyst system comprising a Ziegler/Natta catalyst, to form a second ethylene-based polymer. In a further embodiment, each α-olefin is independently a C1-C8 α-olefin.

In one embodiment, optionally, two or more R groups from $R^9$ through $R^{13}$, or $R^4$ through $R^8$ can combine together into one or more ring structures, with such ring structures each, independently, having from 3 to 50 atoms in the ring, excluding any hydrogen atom.

In one embodiment, M is hafnium.

In one embodiment, $R^3$ and $R^{14}$ are each independently an alkyl, and further a C1-C3 alkyl, and further methyl.

In one embodiment, $R^1$ and $R^{16}$ are each as follows:

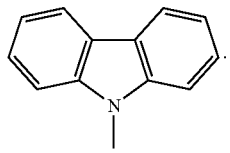

In one embodiment, each of the aryl, heteroaryl, hydrocarbyl, heterohydrocarbyl, Si($R^C$)$_3$, Ge($R^C$)$_3$, P($R^P$)$_2$, N($R^N$)$_2$, O$R^C$, S$R^C$, $R^C$S(O)—, $R^C$S(O)$_2$—, ($R^C$)$_2$C=N—, $R^C$C (O)O—, $R^C$OC(O)—, $R^C$C(O)N(R)—, ($R^C$)$_2$NC(O)—, hydrocarbylene, and heterohydrocarbylene groups, independently, is unsubstituted or substituted with one or more $R^S$ substituents; and each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl.

In one embodiment, two or more of $R^1$ through $R^{16}$ do not combine to form one or more ring structures.

In one embodiment, the catalyst system suitable for producing the first ethylene based polymer is a catalyst system comprising bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following Structure: IA:

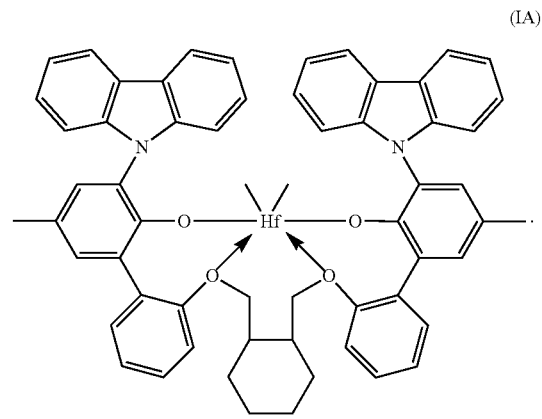

(IA)

The Ziegler/Natta catalysts suitable for use in the invention are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference.

Particularly suitable organomagnesium compounds include, for example, hydrocarbon soluble dihydrocarbylmagnesium, such as the magnesium dialkyls and the magnesium diaryls. Exemplary suitable magnesium dialkyls include, particularly, n-butyl-sec-butylmagnesium, diisopropylmagnesium, di-n-hexylmagnesium, isopropyl-n-butylmagnesium, ethyl-n-hexyl-magnesium, ethyl-n-butylmagnesium, di-n-octylmagnesium, and others, wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides, with the halogen-free organomagnesium compounds being more desirable.

Halide sources include active non-metallic halides, metallic halides, and hydrogen chloride. Suitable non-metallic halides are represented by the formula R'X, wherein R' is hydrogen or an active monovalent organic radical, and X is a halogen. Particularly suitable non-metallic halides include, for example, hydrogen halides and active organic halides, such as t-alkyl halides, allyl halides, benzyl halides and other active hydrocarbyl halides. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active, as defined hereinbefore, are also suitably employed. Examples of preferred active non-metallic halides, include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride, and the like. Most preferred are hydrogen chloride, t-butyl chloride, allyl chloride and benzyl chloride.

Suitable metallic halides include those represented by the formula MRy-a Xa, wherein: M is a metal of Groups IIB, IIIA or IVA of Mendeleev's periodic Table of Elements; R is a monovalent organic radical; X is a halogen; y has a value corresponding to the valence of M; and "a" has a value from 1 to y. Preferred metallic halides are aluminum halides of the formula $AlR_{3-a}X_a$, wherein each R is independently hydrocarbyl, such as alkyl; X is a halogen; and a is a number from 1 to 3. Most preferred are alkylaluminum halides, such as ethylaluminum sesquichloride, diethylaluminum chloride, ethylaluminum dichloride, and diethylaluminum bromide, with ethylaluminum dichloride being especially preferred. Alternatively, a metal halide, such as aluminum trichloride, or a combination of aluminum trichloride with an alkyl aluminum halide, or a trialkyl aluminum compound may be suitably employed.

Any of the conventional Ziegler-Natta transition metal compounds can be usefully employed, as the transition metal component in preparing the supported catalyst component. Typically, the transition metal component is a compound of a Group IVB, VB, or VIB metal. The transition metal component is generally, represented by the formulas: $TrX'_{4-q}(OR1)q$, $TrX'_{4-q}(R2)q$, $VOX'_3$ and $VO(OR)_3$.

Tr is a Group IVB, VB, or VIB metal, preferably a Group IVB or VB metal, preferably titanium, vanadium or zirconium; q is 0 or a number equal to, or less than, 4; X' is a halogen, and R1 is an alkyl group, aryl group or cycloalkyl group having from 1 to 20 carbon atoms; and R2 is an alkyl group, aryl group, aralkyl group, substituted aralkyls, and the like.

The aryl, aralkyls and substituted aralkys contain 1 to 20 carbon atoms, preferably 1 to 10 carbon atoms. When the transition metal compound contains a hydrocarbyl group, R2, being an alkyl, cycloalkyl, aryl, or aralkyl group, the hydrocarbyl group will preferably not contain an H atom in the position beta to the metal carbon bond. Illustrative, but non-limiting, examples of aralkyl groups are methyl, neopentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-iC_3H_7)_4$, and $Ti(O-nC_4H_9)_4$. Illustrative examples of vanadium compounds include $VCl_4$, $VOCl_3$, $VO(OC_2H_5)_3$, and $VO(OC_4H_9)_3$. Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

An inorganic oxide support may be used in the preparation of the catalyst, and the support may be any particulate oxide, or mixed oxide which has been thermally or chemically dehydrated, such that it is substantially free of adsorbed moisture. See U.S. Pat. Nos. 4,612,300; 4,314,912; and 4,547,475; the teachings of which are incorporated herein by reference.

Co-Catalyst Component

The above described catalyst systems can be rendered catalytically active by contacting it to, or combining it with, the activating co-catalyst, or by using an activating technique, such as those known in the art, for use with metal-based olefin polymerization reactions. Suitable activating co-catalysts, for use herein, include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyealuminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri (($C_1$-$C_{20}$)hydrocarbyeammonium tetra(($C_1$-$C_{20}$)hydrocarbyl)borane (e.g., bis(octadecyl)methylammonium tetrakis (pentafluorophenyl)borane). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyealuminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught, with respect to different metal-ligand complexes, in the following U.S. patents: U.S. Pat. Nos. 5,064,802; 5,153,157; 5,296,433; 5,321,106; 5,350, 723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion, as activating co-catalysts for addition polymerization catalysts, are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts, as activating co-catalysts for addition polymerization catalysts, are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1, beginning at column 50, at line 39, and going through column 56, at line 55, only the portion of which is incorporated by reference herein.

In embodiments, the above described catalyst systems can be activated to form an active catalyst composition by combination with one or more cocatalysts, such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to, modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. In one embodiment, a combination of a mixture of a tri($C_1$-$C_4$)hydrocarbyealuminum, tri($C_1$-$C_4$)hydrocarbyeborane, or an ammonium borate with an oligomeric or polymeric alumoxane compound, can be used.

Articles

Embodiments of the present disclosure also relate to articles, such as irrigation tubing, formed from the polyethylene formulations of the present disclosure. Such articles can be formed from any of the polyethylene formulations of the present disclosure described herein. Irrigation tubing may include perforations in the walls of the tubing that allow for water (or other liquids) to be discharged through the perforations and it flows through the tubing. Irrigation tubing may include one or more tubes, including the inner (or "supply") and outer (or "discharge") tubes, which may each include perforations. Irrigation tubing of the present disclosure may be particularly useful in applications where a balance of stiffness and burst strength properties is desired. Examples of such irrigation tubing can include drip tapes and tubing. Such plastic irrigation tubing may be of substantial benefit particularly in arid climates. The lightweight nature of the tubing may permit the tubing to be readily buried by hand or beneficially by the use of a mole plow, wire laying plow or like apparatus to convenient depth in the soil.

Irrigation tubing may be formed film comprising the polyethylene formulations described herein, where two strips of film are perforated, aligned in a face-to-face relationship, folded, and heat sealed to form a seal at the edges where the two strips of film meet.

In use, by maintaining water pressure through the irrigation tubing, (i.e on the order of a few pounds per square inch), a continuous supply of moisture may be fed into the soil. Irrigation tubing may therefore provide an effective irrigation system that may be relatively low in cost to install. In some embodiments, the irrigation tubing may be installed in such a manner that its elevation is maintained reasonably constant, otherwise flow in lower portions will be much greater than in higher portions.

Conventional polyolefin compositions suitable for drip irrigation applications may include a blend of a linear low density polyethylene (LLDPE) with a medium density polyethylene (MDPE), a high density polyethylene (HDPE), a low density polyethylene (LDPE), or combinations thereof. However, in embodiments of the present disclosure, providing a polyethylene formulation comprising an MDPE, the polyethylene composition described herein, and a masterbatch composition may provide a combination of desirable burst strength without compromising stiffness even at reduced thicknesses of 15%. As such, embodiments of the present disclosure may provide a polyethylene formulation that, when utilized in irrigation tubing, provides a balance of improved stiffness and burst strength properties while allowing for reduced material costs.

The irrigation tubing of the present disclosure can have a variety of thicknesses. The thickness of the irrigation tubing may depend on a number of factors including, for example, the composition of the polyethylene formulation, the desired properties of the irrigation tubing, the desired end-use application of the irrigation tubing, the manufacturing process of the irrigation tubing, and others. In embodiments, the irrigation tubing may have a thickness of from 5 mils to 50 mils, from 5 mils to 40 mils, from 5 mils to 30 mils, from 5 mils to 20 mils, from 5 mils to 10 mils, from 10 mils to 50 mils, from 10 mils to 40 mils, from 10 mils to 30 mils, from 10 mils to 20 mils, from 20 mils to 50 mils, from 20 mils to 40 mils, from 20 mils to 30 mils, from 30 mils to 50 mils, from 30 mils to 40 mils, or from 40 mils to 50 mils.

In embodiments, the article may be a drip tape that has a thickness of from 16 mil to 18 mil and a burst strength of greater than 6.5 bar when measured according to NBR ISO 9261. According to one or more embodiments, the article may be a drip tape that has a thickness of from 16 mil to 18 mil and a burst strength of greater than or equal to 6.5 bar, greater than or equal to 7.0 bar, or greater than or equal to 7.5 bar when measured according to NBR ISO 9261. According to one or more embodiments, the article may be a drip tape that has a thickness of from 16 mil to 18 mil and a burst strength of from 6.5 bar to 9.0 bar, from 6.5 bar to 8.5 bar, from 6.5 bar to 8.0 bar, from 6.5 bar to 7.5 bar, from 6.5 bar to 7.0 bar, from 7.0 bar to 9.0 bar, from 7.0 bar to 8.5 bar, from 7.0 bar to 8.0 bar, from 7.0 bar to 7.5 bar, from 7.5 bar to 9.0 bar, from 7.5 bar to 8.5 bar, from 7.5 bar to 8.0 bar, from 8.0 bar to 9.0 bar, from 8.0 bar to 8.5 bar, or from 8.5 bar to 9.0 bar, when measured according to NBR ISO 9261.

In embodiments, the article may be a drip tape that has a thickness of from 16 mil to 18 mil and a 2% secant modulus in the machine direction of greater than 150 MPa when measured according to ASTM D882. According to one or more embodiments, the article may be a drip tape that has a thickness of from 16 mil to 18 mil and a 2% secant modulus in the machine direction of greater than 150 MPa, greater than or equal to 155 MPa, greater than or equal to 160 MPa, or greater than or equal to 165 MPa when measured according to ASTM D882. According to one or more embodiments, the article may be a drip tape that has a thickness of from 16 mil to 18 mil and a 2% secant modulus in the machine direction of from 150 MPa to 180 MPa, from 150 MPa to 170 MPa, from 150 MPa to 160 MPa, from 160 MPa to 180

MPa, from 160 MPa to 170 MPa, or from 170 MPa to 180 MPa when measured according to ASTM D882.

In embodiments, the article may be a drip tape that has a thickness of from 16 mil to 18 mil and a stress at yield of at least 6.8 MPa when measured according to ASTM D882. According to one or more embodiments, the article may be a drip tape that has a thickness of from 16 mil to 18 mil and a stress at yield of greater than or equal to 6.8 MPa, greater than or equal to 7.0 MPa, or greater than or equal to 7.5 MPa when measured according to ASTM D882. According to one or more embodiments, the article may be a drip tape that has a thickness of from 16 mil to 18 mil and a stress at yield of from 6.8 MPa to 10.0 MPa, from 6.8 MPa to 9.0 MPa, from 6.8 MPa to 8.0 MPa, from 6.8 MPa to 7.0 MPa, from 7.0 MPa to 10.0 MPa, from 7.0 MPa to 9.0 MPa, from 7.0 MPa to 8.0 MPa, from 8.0 MPa to 10.0 MPa, from 8.0 MPa to 9.0 MPa, or from 9.0 MPa to 10.0 MPa, when measured according to ASTM D882.

In embodiments, the article may be a drip tape that has a thickness of from 16 mil to 18 mil and a stress at break of at least 10.5 MPa when measured according to ASTM D882. According to one or more embodiments, the article may be a drip tape that has a thickness of from 16 mil to 18 mil and a stress at break of greater than or equal to 10.5 MPa, greater than or equal to 11.0 MPa, greater than or equal to 11.5 MPa, or greater than or equal to 12.0 MPa when measured according to ASTM D882.

According to one or more embodiments, the article may be a drip tape that has a thickness of from 16 mil to 18 mil and a stress at break of from 10.5 MPa to 14.0 MPa, from 10.5 MPa to 13.5 MPa, from 10.5 MPa to 13.0 MPa, from 10.5 MPa to 12.5 MPa, from 10.5 MPa to 12.0 MPa, from 10.5 MPa to 11.5 MPa, from 10.5 MPa to 11.0 MPa, from 11.0 MPa to 14.0 MPa, from 11.0 MPa to 13.5 MPa, from 11.0 MPa to 13.0 MPa, from 11.0 MPa to 12.5 MPa, from 11.0 MPa to 12.0 MPa, from 11.0 MPa to 11.5 MPa, from 11.5 MPa to 14.0 MPa, from 11.5 MPa to 13.5 MPa, from 11.5 MPa to 13.0 MPa, from 11.5 MPa to 12.5 MPa, from 11.5 MPa to 12.0 MPa, from 12.0 MPa to 14.0 MPa, from 12.0 MPa to 13.5 MPa, from 12.0 MPa to 13.0 MPa, from 12.0 MPa to 12.5 MPa, from 12.5 MPa to 14.0 MPa, from 12.5 MPa to 13.5 MPa, from 12.5 MPa to 13.0 MPa, from 13.0 MPa to 14.0 MPa, from 13.0 MPa to 13.5 MPa, from 13.5 MPa to 14.0 MPa, when measured according to ASTM D882.

Various methods of producing embodiments of articles, such as irrigation tubing, from the polyethylene formulations disclosed herein would be familiar to one of ordinary skill in the art. Various methodologies are contemplated for producing embodiments of the irrigation tubing. In one or more embodiments, the process of manufacturing the irrigation tubing may include cast film extrusion or blown film extrusion.

Test Methods

The test methods include the following:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

Creep Zero Shear Viscosity Measurement Method

Zero-shear viscosities are obtained via creep tests that were conducted on an AR-G2 stress controlled rheometer (TA Instruments; New Castle, Del) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of c vs. t, where c is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad (EQ\ 1)$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, Peak max is the maximum position of the peak, one tenth height is ⅒ height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$Mz_{(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

Flowrate(effective)=Flowrate(nominal)*(RV(FM Calibrated)/RV(FM Sample)) (EQ 7)

Improved Method for Comonomer Content Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×1/4" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations (EQ) 8 and 9:

$$ZSVR = \frac{\eta_{0B}}{\eta_{0L}} \qquad \text{(EQ 8)}$$

$$\eta_{0L} = 2.29 \times 10^{-15} M_{w-gpc}^{3.65} \qquad \text{(EQ 9)}$$

The ZSV value is obtained from creep test at 190° C. via the method described above. The Mw-gpc value is determined by the conventional GPC method (Equation 5 of the Conventional GPC method). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

Dynamic Rheological Analysis

To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = [3650000 \times (\tau_0/\eta_0) - 1]/10 \qquad \text{(EQ 10)}$$

wherein $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega)=\eta_0/[1+(\omega\cdot\tau_0)^n] \qquad \text{(EQ 11)}$$

wherein n is the power law index of the material, $\eta^*(\omega)$ and $\omega$ are the measured complex viscosity and applied frequency data respectively.

Dynamic rheological measurements are carried out, according to ASTM D4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilized (with anti-oxidant additives), compression-moulded sample onto the parallel plates. The plates are then closed with a positive normal force registered on the meter to ensure good contact. After approximately 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for approximately 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus, loss (or viscous) modulus (G"), complex modulus (G*), complex viscosity ($\eta^*$) and tan $\delta$ (the ratio of loss modulus and storage modulus, G'VG') were obtained as a function of frequency (0)) at a given temperature (e.g., 190° C.).

ASTM D882 MD and CD, 1% and 2% Secant Modulus

The film MD (Machine Direction) and CD (Cross Direction) secant modulus was determined per ASTM D882. The reported secant modulus value was the average of five measurements.

Burst Strength

Burst strength of pipe samples was measured in accordance to NBR ISO 9261. The values are reported in bar.

Molecular Weighted Comonomer Distribution Index (MWCDI)

A GPC-IR, high temperature chromatographic system from PolymerChar (Valencia, Spain) was equipped with a Precision Detectors' (Amherst, MA) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, CA).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 12 (as described in Williams and Ward, J. Polym. Sci., Polym. Let., 6, 621 (1968)):

$$M\text{polyethylene}=A\times(M\text{polystyrene})^B \qquad \text{(Eqn. 12)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 14, below:

$$Mn(LALS\,gpc) = \frac{\sum_{i=RV_{integration\,start}}^{i=RV_{integration\,end}} \left(IR_{measurement\,channel_i}\right)}{\sum_{i=RV_{integration\,start}}^{i=RV_{integration\,end}} \left(IR_{measurement\,channel_i}/M_{PE_i}\right)} \qquad \text{(Eqn. 13)}$$

$$Mw(LALS\,gpc) = \frac{\sum_{i=RV_{integration\,start}}^{i=RV_{integration\,end}} \left(M_{PE_i} IR_{measurement\,channel_i}\right)}{\sum_{i=RV_{integration\,start}}^{i=RV_{integration\,end}} \left(IR_{measurement\,channel_i}\right)} \qquad \text{(Eqn. 14)}$$

In Equations 13 and 14, RV is column retention volume (linearly-spaced), collected at "1 point per second." The IR is the baseline-subtracted IR detector signal, in Volts, from the measurement channel of the GPC instrument, and the MPE is the polyethylene-equivalent MW determined from Equation 12. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}C$ NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table A.

TABLE A

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

$$SCB/1000\ total\ C = A_0 + [A_1 \times (IR5_{Methyl\ Channel\ Area}/IR5_{Measurement\ Channel\ Area})] \quad \text{(Eqn. 4B)},$$

where $A_0$ is the "SCB/1000 total C" intercept at an "IR5 Area Ratio" of zero, and $A_1$ is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

$$\text{Mole Percent Comonomer} = \{SCB_f/[SCB_f + ((1000 - SCB_f \times \text{Length of comonomer})/2)]\} \times 100 \quad \text{(Eqn. 5B)},$$

where "$SCB_f$" is the "SCB per 1000 total C" and the "Length of comonomer"=8 for octene, 6 for hexene, and so forth.

Each elution volume index was converted to a molecular weight value ($Mw_i$) using the method of Williams and Ward (described above; Eqn. 1). The "Mole Percent Comonomer (y axis)" was plotted as a function of Log($Mw_i$), and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

The following examples illustrate features of the present disclosure but are not intended to limit the scope of the disclosure. The following experiments analyzed the performance of embodiments of the polyethylene formulations described herein.

Example 1: Preparation of Polyethylene Composition 1

Polyethylene Composition 1 is discussed in connection with Examples 3-5 below. Polyethylene Composition 1 contains an ethylene-octene copolymer. This composition was prepared using the catalyst system subsequently described under the polymerization conditions reported in Table 1.

Polyethylene Composition 1 was prepared via solution polymerization in a dual series loop reactor system according to U.S. Pat. No. 5,977,251, as described below, in the presence of a first catalyst system in the first reactor and a second catalyst system in the second reactor.

The first catalyst system comprised a bis((2-oxoyl-3-(dibenzo-1H-pyrrole-1-yl) (methyl)phenyl)-2-phenoxymethyl)-methylene-1,2-cyclohexanediylhafnium (IV) dimethyl, represented by the following formula (CAT 1):

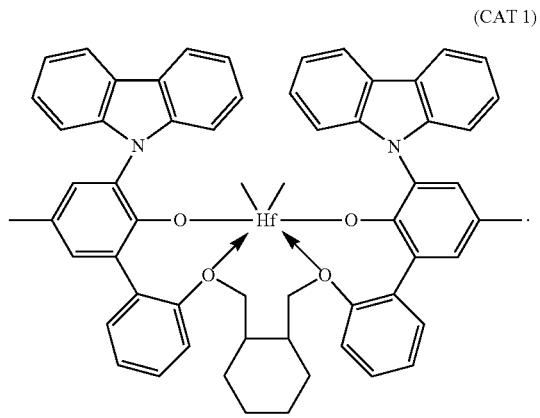

(CAT 1)

The molar ratios of the metal of CAT 1, added to the polymerization reactor, in-situ, to that of Cocat1 (modified methyl aluminoxane), or Cocat2 (bis(hydrogenated tallow alkyl)methyl, tetrakis(pentafluorophenyl)borate(1-) amine), are shown in Table 1.

The second catalyst system comprised a Ziegler-Natta type catalyst (CAT 2). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of EtAlCl2 in heptane, and a solution of Ti(O-iPr)$_4$ in heptane, to yield a composition containing a magnesium concentration of 0.20M, and a ratio of Mg/Al/Ti of 40/12.5/3. An aliquot of this composition was further diluted with ISOPAR-E to yield a final concentration of 500 ppm Ti in the slurry. While being fed to, and prior to entry into, the polymerization reactor, the catalyst premix was contacted with a dilute solution of $Et_3Al$, in the molar Al to Ti ratio specified in Table 1, to give the active catalyst.

The polymerization conditions for Polyethylene Composition 1 are reported in Table 1. As seen in Table 1, Cocat. 1 (modified methyl aluminoxane (MMAO)); and Cocat. 2 (bis(hydrogenated tallow alkyl)methyl, tetrakis(pentafluorophenyl)borate(1-) amine) were each used as a cocatalyst for CAT 1. Polyethylene Composition 1 was stabilized with minor (ppm) amounts of stabilizers.

TABLE 1

Polymerization Conditions of Polyethylene Composition 1.

|  | Units | Polyethylene Composition 1 |
|---|---|---|
| Reactor Configuration |  | Dual Series |
| Comonomer |  | 1-octene |
| REACTOR FEEDS |  |  |
| First Reactor Total Solvent Flow | lb/hr | 814 |
| First Reactor Total Ethylene Flow | lb/hr | 175 |
| First Reactor Total Comonomer Flow | lb/hr | 62 |
| First Reactor Hydrogen Feed Flow | SCCM | 3276 |
| Second Reactor Total Solvent Flow | lb/hr | 400 |
| Second Reactor Total Ethylene Flow | lb/hr | 180 |
| Second Reactor Total Comonomer Flow | lb/hr | 11 |
| Second Reactor Hydrogen Feed Flow | SCCM | 1782 |
| REACTION |  |  |
| First Reactor Control Temperature | ° C. | 160 |
| First Reactor Ethylene Conversion | % | 90.9 |
| First Reactor Viscosity | cP | 4361 |
| Second Reactor Control Temperature | ° C. | 195 |
| Second Reactor Ethylene Conversion | % | 86.4 |
| Second Reactor Viscosity | cP | 1548 |
| CATALYST |  |  |
| First Reactor Catalyst | Type | CAT 1 |
| First Reactor Catalyst Efficiency | g polymer per g catalyst metal | 907560 |
| First Reactor Cocatalyst (Cocat. 2) to Catalyst Metal Molar Ratio | Ratio | 1.2 |
| First Reactor Cocatalyst (Cocat. 1) to Catalyst Metal Molar Ratio | Ratio | 50.0 |
| Second Reactor Catalyst Efficiency | g polymer per g catalyst metal | 458017 |
| Second Reactor Al to Ti Molar Ratio | Ratio | 4.0 |

*solvent = ISOPAR E

Example 2: Comparative Composition A

Comparative Composition A was DOWLEX™ 2045, a linear low density polyethylene commercially-available from The Dow Chemical Company.

Example 3: Comparison of Polyethylene Composition 1 and Comparative Composition A The properties of Polyethylene Composition 1 and Comparative Composition A were measured according to the test methods described herein and are reported in Table 2.

TABLE 2

Properties of Comparative Sample A and Sample 1.

|  | Unit | Comparative Composition A | Polyethylene Composition 1 |
|---|---|---|---|
| Density | g/cc | 0.9198 | 0.9185 |
| $I_2$ | g/10 min | 1.12 | 0.84 |
| $I_{10}/I_2$ |  | 8.6 | 8.1 |
| 7-1.2 × log ($I_2$) |  | 6.9 | 7.1 |
| Mn (conventional GPC) | g/mol | 9,466 | 33,304 |
| Mw (conventional GPC) |  | 127,841 | 116,005 |
| Mz (conventional GPC) |  | 525,636 | 268,386 |
| Mw/Mn (conventional GPC) |  | 13.51 | 3.48 |
| Mz/Mw (conventional GPC) |  | 4.11 | 2.31 |
| Eta* (0.1 rad/s) | Pa · s | 8,368 | 10,755 |
| Eta* (1 rad/s) | Pa · s | 6,735 | 7,842 |
| Eta* (10 rad/s) | Pa · s | 4,104 | 4,508 |
| Eta* (100 rad/s) | Pa · s | 1,664 | 1,723 |
| Eta* 0.1/Eta* 100 |  | 5 | 6.24 |
| Eta zero | Pa · s | 9,631 | 13,821 |
| MWCDI |  | −1.01 | 2.59 |
| ZSVR |  | 1.4 | 1.97 |
| First PE fraction area (45° C.-87° C.) |  | 39.50% | 60.58% |
| Second PE fraction area (95° C.-120° C.) |  | 14.73% | 17.33% |
| Ratio of first PE fraction area to second PE fraction area |  | 2.68 | 3.50 |

Example 4: Preparation of Comparative Sample Tubing A and Sample Tubing 1-3

In Example 4, four irrigation tubing samples were produced from the polyethylene formulations of Table 3 using the following extrusion parameters: The irrigation tubing samples were made using a profile extruder with a round-shaped die, subsequent vacuum system (to control the tubing diameter), and a water cooling bath. The extrusion speed was 170 meters/min; the extrusion temperature profile was 220° C./220° C./230° C./240° C./250° C.; the melt pressure was 193 bar, and the melt temperature was 260° C.

TABLE 3

Formulations of Comparative Sample Tubing A, Sample Tubing 1, Sample Tubing 2, and Sample Tubing 3.

|  | Comparative Sample Tubing A | Sample Tubing 1 | Sample Tubing 2 | Sample Tubing 3 |
|---|---|---|---|---|
| Pipe Thickness (mil) | 18 | 18 | 17 | 16 |
| MDPE NG 7525 (wt. %) | 60 | 60 | 60 | 60 |
| Polyethylene Composition 1 (wt. %) | 0 | 36 | 36 | 36 |
| DOWLEX ™ 2045 (wt. %) | 36 | 0 | 0 | 0 |
| Carbon Black MB (wt. %) | 4 | 4 | 4 | 4 |

Example 5: Comparison of Comparative Sample Tubing A and Sample Tubing 1-3

The properties of Comparative Sample Tubing A and Sample Tubing 1-3 were measured according to the test methods described herein and are reported in Table 4.

TABLE 4

Properties of Comparative Sample Pipe A, Sample Pipe 1, Sample Pipe 2, and Sample Pipe 3.

| | Comparative Sample Tubing A | Sample Tubing 1 | Sample Tubing 2 | Sample Tubing 3 |
|---|---|---|---|---|
| 2% Secant modulus (MPa) | 162.1 | 150.2 | 157.4 | 169.2 |
| Stress at break (MPa) | 11.04 | 10.83 | 12.16 | 12.42 |
| Stress at Yield (MPa) | 6.8 | 6.8 | 7.9 | 7.5 |
| Burst Strength (bar) | 6.5 | 7.5 | 6.9 | 6.9 |

As shown in Table 4, Sample Tubing 1 presented higher burst strength when compared to the Comparative Sample Tubing A at same thickness (18 mil). Additionally, Polyethylene Formulation 1 in Sample Tubing 2 and 3 allowed for tubing with reduced thickness (17 and 16 mil, Sample Tubing 2 and 3, respectively) to deliver superior burst strength than Comparative Sample Tubing A. As such, embodiments of the present disclosure may provide a polyethylene formulation (such as Polyethylene Formulation 1) that, when utilized in irrigation tubing, provides a balance of comparable or improved stiffness and burst strength properties while allowing for reduced material costs.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A polyethylene formulation comprising:
   from 45 weight percent (wt %) to 90 wt. % of a medium density polyethylene (MDPE) having a density of from 0.930 grams per cubic centimeter (g/cc) to 0.950 g/cc and a melt index ($I_2$) from 0.05 grams per ten minutes (g/10 min) to 0.5 g/10 min;
   from 10 wt % to 50 wt % of a polyethylene composition having a density from 0.910 g/cc to 0.936 g/cc and a melt index ($I_2$) from 0.25 g/10 min to 2.0 g/10 min; and
   from 0.5 wt % to 5 wt % of a masterbatch composition;
   wherein the polyethylene composition comprises:
   a first polyethylene fraction area in a temperature range of 45° C. to 87° C. of an elution profile via improved comonomer composition distribution (iCCD) analysis method, wherein the first polyethylene fraction area comprises at least 50% of a total area of the elution profile;
   a second polyethylene fraction area in a temperature range of 95° C. to 120° C. of an elution profile via improved comonomer composition distribution (iCCD) analysis method, wherein the second polyethylene fraction area comprises less than or equal to 23% of the total area of the elution profile; and
   wherein a ratio of the first polyethylene fraction area to the second polyethylene fraction area is 2.9 to 12.5.

2. The polyethylene formulation of claim 1, wherein the masterbatch composition is a carbon black masterbatch composition.

3. The polyethylene formulation of claim 1, wherein the polyethylene composition has a molecular weight distribution (Mw/Mn) of from 2.0 to 5.0.

4. The polyethylene formulation of claim 1, wherein the polyethylene composition has a Mz/Mw of from 1.5 to 3.5.

5. The polyethylene formulation of claim 1, wherein the polyethylene composition has an Mz of from 200,000 g/mol to 400,000 g/mol.

6. The polyethylene formulation of claim 1, wherein the polyethylene composition has an $I_{10}/I_2$ of from 5.5 to 8.5.

7. The polyethylene formulation of claim 1, wherein the first polyethylene fraction area is from 50% to 80% of the total area of the elution profile of the polyethylene composition.

8. The polyethylene formulation of claim 1, wherein the second polyethylene fraction area is from 6% to 23% of the total area of the elution profile of the polyethylene composition.

9. The polyethylene formulation of claim 1, wherein a ratio of the first polyethylene fraction area to the second polyethylene fraction area is from 3.0 to 6.0.

10. The polyethylene formulation of claim 1, wherein the polyethylene composition has a molecular weighted comonomer distribution index MWCDI of from 1.0 to 10.0.

11. An article comprising the polyethylene formulation of claim 1.

12. The article of claim 11, wherein the article is a drip tape.

13. The article of claim 12, wherein the drip tape has a thickness of from 16 mil to 18 mil and a burst strength of greater than 6.5 bar when measured according to NBR ISO 9261.

14. The article of claim 12, wherein the drip tape has a thickness of from 16 mil to 18 mil and a 2% secant modulus in the machine direction of greater than 150 MPa when measured according to ASTM D882.

15. The article of claim 12, wherein the drip tape has a thickness of from 16 mil to 18 mil and a stress at yield of at least 6.5 MPa when measured according to ASTM D882.

* * * * *